Aug. 24, 1965　　　W. F. HENNESSEY, JR　　　3,202,956
ELECTRICAL CONNECTOR
Filed Aug. 12, 1963　　　2 Sheets-Sheet 2
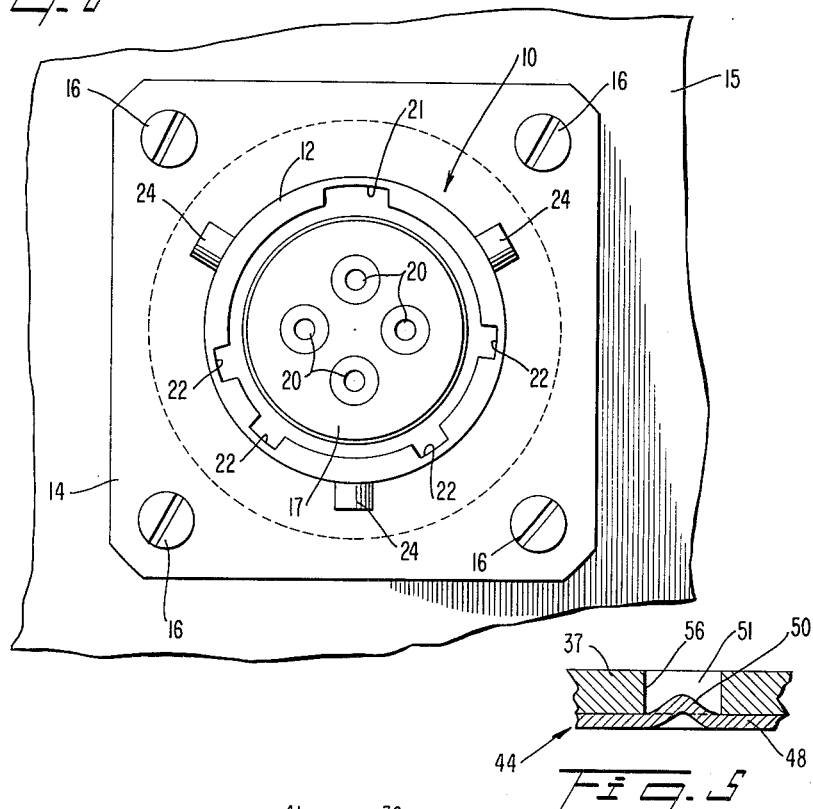
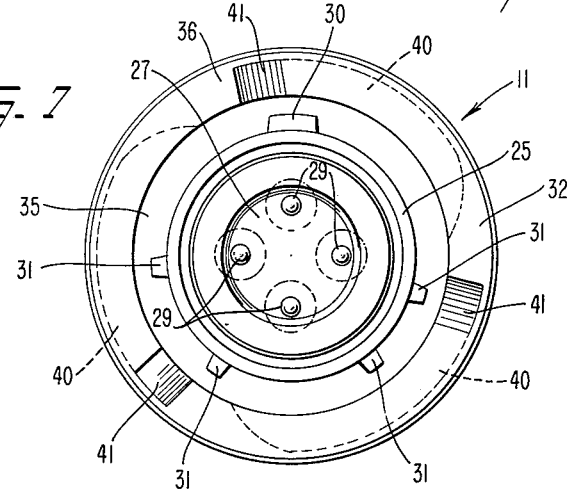
INVENTOR.
WALTER F. HENNESSEY, Jr
BY
Bauer and Seymour
ATTORNEYS

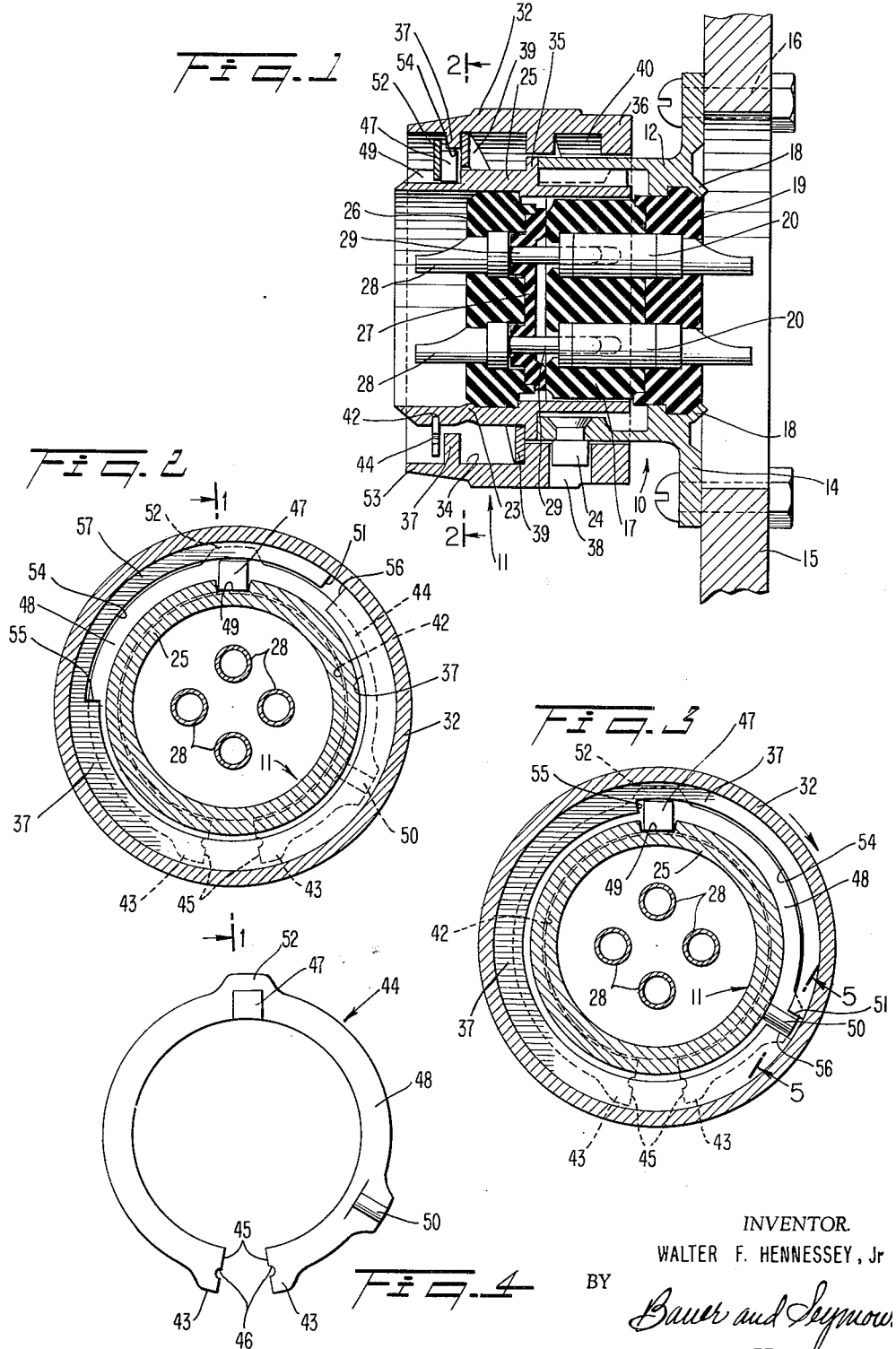

United States Patent Office 3,202,956
Patented Aug. 24, 1965

3,202,956
ELECTRICAL CONNECTOR
Walter F. Hennessey, Jr., Sidney, N.Y., assignor to The Bendix Corporation, Sidney, N.Y., a corporation of Delaware
Filed Aug. 12, 1963, Ser. No. 301,278
11 Claims. (Cl. 339—90)

This invention relates to a separable connector, and more particularly to a separable electrical connector, the main parts of the connector being secured together by a rotatable nut.

The connector of the invention is illustrated herein in connection with a separable electrical connector of the type described and claimed in the patent to Hennessey et al., No. 2,984,811. The connector shown in such patent, although completely satisfactory from electrical and mechanical points of view, before connection of the parts requires the securing nut to be properly oriented with respect to the polarizing interfitting means on the two connector parts. This ordinarily requires a preliminary turning of the nut before the parts can be connected, an operation which is sometimes difficult and time consuming particularly when the connector is located in cramped quarters.

Generally speaking, the separable connector of the present invention incorporates mechanism for automatically aligning the connector part-coupling nut at the end of the connector part-separating operation, so that the connector part carrying the nut is immediately in condition to be attached, when desired, to the same or another cooperating connector part. Such mechanism incorporates means for stably holding the nut angularly with respect to the body of its connector part and relative to the polarizing formation or formations on such body. One embodiment of such mechanism incorporates a ring-like element mounted in an external annular groove on a cylindrical connector part, said element being held against rotational movement on said connector part by an axially extending lug thereon which engages an external axially extending groove in the connector part. Said ring-like element extends radially from said annular groove for engagement by an internal flange or its equivalent in the coupling nut to limit axial movement of the latter in one direction while said lug and a second axial projection on said element cooperate with said flange to limit angular movement of the nut relative to the connector part and to yieldably retain the nut in a selected angular position relative to the connector part.

The invention has among its objects the provision of a novel separable connector of the rotatable nut-coupled type. A further object of the invention is the provision of a separable connector of the nut-coupled type which incorporates means to retain the nut in a predetermined angular position at the end of the connector part uncoupling operation.

Yet another object of the invention resides in the provision of a novel separable connector of the nut-coupled type, the parts of which are automatically placed in condition for instant preliminary engagement which may then be followed by a coupling of the connector parts by rotation of the nut.

A still further object of the invention is the provision of a novel separable connector, the main parts of which are provided with shells of the nut-coupled type, such connector including mechanism stably retaining the nut on its connector part when the connector parts are uncoupled.

A still further object of the invention lies in the provision of a novel separable connector, particularly a separable electrical connector of the above indicated type, which is simple, rugged, and economical to make, assemble and maintain.

The above and further objects and novel features of the invention will more fully appear from the following detailed description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in vertical axial section through the mated connector parts of an illustrative separable electrical connector, the section being taken along the line 1—1 of FIG. 2;

FIG. 2 is a view in vertical transverse section through the rear portion of the connector part at the left in FIG. 1, the section being taken along the line 2—2 of FIG. 1 the coupling nut being shown turned to its coupling position in relation to the mated connector parts;

FIG. 3 is a view similar to FIG. 2, but with the coupling nut turned to its uncoupling or connector part releasing position;

FIG. 4 is a view in elevation of a spring ring or locking washer employed in the left hand (FIG. 1) connector part for retaining the nut in angularly stable position on the shell of such part, the spring ring being shown as it appears from the plane of line 2—2 in FIG. 1;

FIG. 5 is a fragmentary view in section taken along the line 5—5 of FIG. 3;

FIG. 6 is a view in end elevation of the right hand connector part employed in the connector of FIG. 1, the view being taken from the left in FIG. 1; and FIG. 7 is a view in end elevation of the left hand part of the connector and the coupling nut of FIG. 1, the view taken from the right in FIG. 1.

In the illustrative connector shown herein, the right hand connector part is designated 10 and the left hand connector part is designated 11. The connector parts are shown fully matingly engaged in FIG. 1 and separately and in end elevation in FIGS. 6 and 7. Connector part 10 has a hollow generally circular cylindrical shell 12 such shell having a flange 14 on its rear end by means of which the connector part may be attached to a mounting panel 15 as by bolts 16. Connector part 10 in this instance supports a plurality (four shown) of female or socket contacts 20 which are mounted in spaced relationship in a composite electrical insulating insert composed of inner and outer parts 17 and 19 in this embodiment are made of electrical insulating material, such as phenol formaldehyde, the insert parts being bonded together over their confronting faces as by an adhesive. The resulting integrally bonded insert is retained in shell 12 by the reception of a flange on the rear end of the insert in an annular seat in the shell, the rim of the shell rearwardly thereof being spun angularly inwardly as shown at 18 over the rear outer edge of the insert.

The shell 12, as more clearly shown in FIG. 6, is provided with a plurality of polarizing formations; such formations are composed of a wide axially extending inner groove or keyway 21 in the top of the shell as it is shown in FIGS. 1 and 6, and four unequally angularly spaced narrower inner grooves or keyways 22 lying generally in the bottom half of the shell 12. The shell 12 is also provided with coupling nut-engaging means in the form of a plurality of equally angularly spaced (three shown) radially outwardly extending lugs or pins 24.

The connector part 11 has a generally circular cylindrical hollow shell 25, the forward, right hand end of which is of reduced diameter and accurately telescopes within the forward end of the shell 12 of the connector part 10. Shell 25 carries therewithin a composite elecical insulating insert made up of parts 26 and 27, the composite insert bearing four contact pins 29 so spaced as to be received within the sockets 20 of the connector part 0. Insert part 26 may be made of hard plastic material whereas part 27, which is bonded to part 26, is preferably made of soft resilient rubber-like material so as to form an end seal between the inserts of the respective connector parts 10 and 11 when such parts are engaged as shown in FIG. 1. The composite insert 26, 27 is retained in shell 5 as by an annular rearwardly facing internal shoulder in the shell and inward indentations of the shell adjacent the rear of the insert part 26 at zones spaced angularly of the shell, one of such zones 23 being shown on the bottom of the shell in FIG. 1. Shell 25 has a plurality of polarizing formations or keys interfitting with the polarizing grooves in shell 12; the formations on shell 25 consist of a large rib or land 30 and four suitable angularly spaced narrower keys or lands 31.

The shell 25 carries a sleeve-like nut 32 which is novelly mounted thereon for limited angular movement relative thereto. The nut, carrying formations which engage the pins 24 on shell 12, is held on the shell 25 so that the rotation of the nut in one direction draws the aligned connector parts into fully engaged mated condition as shown in FIG. 1, and so that rotation of the nut in the opposite direction jacks or withdraws the connector parts from each other so that they are substantially completely separated from each other.

The nut 32 has an annular seat 34 therein, the forward end of such seat being substantially aligned with the rear surface of an annular flange 35 on shell 25 intermediate the length of the latter. The rear surface of the annular seat 34 is formed by an annular radially inwardly projecting flange 37 adjacent the rear end of nut 32. Positioned in seat 34 is a wavy annular spring 39, the forward peaks or high points of which engage flange 35, and the rear peaks or high points of which engage flange 37. As will be seen hereinafter, the spring 39 is maintained under constant compression, so that the nut 32 is constantly resiliently urged in a direction rearwardly or to the left in FIG. with respect to the shell 25. The forward end of nut 32 is helically inwardly grooved at three locations, such helical grooves being designated 40 and the entering or open forward ends thereof in portion 36 of the nut being designated 41. The inner ends of the helical grooves may be provided with seats 38 formed by radial holes through the nut, the pins 24 stably lying within the seats 38 when the connector parts are fully engaged, the wavy spring 39 then being held under substantial compression between flanges 35 and 37.

The nut 32 is novelly retained upon shell 25, when the parts are uncoupled, in the following manner. An annular groove 42 is provided in the outer surface of the shell 25 adjacent the rear end of the shell. A split spring ring 44 is snapped into groove 42 with the inner edge of the spring ring lying stably in the groove, as shown, and within an annular hood 53 on the rear end of the nut 32. The ring 44 has a generally annular body 48, the body being split at one zone, at the bottom in FIG. 4, the confronting faces 45 at such split having central manipulating notches 46 therein, there being radially projecting tabs 43 on the ring adjacent each of its ends at the split. The spring ring 44 has an axially extending lug 47 thereon at a location opposite the split in the ring, a radially outwardly extending tab 52 also being located on the ring at such location. Lug 47 has a radial dimension substantially equal to that of the body 48. Angularly spaced from lug 47, in the manner shown in FIGS. 2, 3, and 4, is an axially arched projection 50 which may be formed in the stock of body 48 as by lancing and staking operations. The spring ring 44 may be made, for example, of beryllium-copper alloy. The radial projections 43 and 52 and a similar projection at lug 50 closely approach hood portion 53 and prevent removal of ring 44 unless nut 32 is moved sufficiently forward against the compression of spring 39.

The spring ring 44 is mounted in connector part 11 in the manner shown in FIGS. 1, 2, and 3. The shell 25 is provided with an axially extending outer groove 49 on the upper portion thereof (FIGS. 1, 2, and 3), groove 49 stably receiving and retaining the projection 47 to hold the spring ring against rotation relative to shell 25. The spring ring is mounted in the connector part by thrusting the shell 25 rearwardly with respect to the nut 32 against the compressive force of spring 39, and then snapping the spring ring in place in the annular groove 42 so that the lug 47 lies in groove 49 in the shell. When the spring ring has been thus mounted, radially outwardly disposed portions of the ring, including the tabs 43 and 52, lie rearwardly of and engage the flange 37 on the nut 32, thereby serving as an axial stop for the nut.

An inner edge portion of flange 37 is cut away along an arc lying slightly radially outwardly of the outer edges of body 47 and lug 47 of ring 44, as indicated at 54, to allow the passage of the lug 47 inwardly into the groove 49 as described. The tab 52 on ring 44 overlies the remaining reduced portion 57 of flange 37 at the cut away portion 54 so that engagement is furnished between the flange and the ring at such location. Such cut away portion 54 has radial stops 55 and 56 at its ends for engaging lug 47, the stops being so spaced angularly as to provide the nut 32 with slightly more freedom of angular motion than is necessary to turn it between its connector part-uncoupled to its part-coupled positions. The flange 37 may be grooved or completely cut away adjacent stop 56 to provide a detent or slot 51 for receiving and cooperating with projection 50 to yieldably hold nut 32 in desired relation to shell 25 when the connector parts 10 and 11 are separated. When the nut 32 lies in the connector part-coupled position of FIG. 2, the arched projection 50 lies to the rear of the outer surface of flange 37, the nut having moved forward during the bayonet coupling action to compress spring 39 and to disengage flange 37 and ring 44. When, however, the nut 32 is turned into its connector part-uncoupled position, as shown in FIG. 3, the nut is moved rearwardly on shell 25 by spring 39 to engage flange 37 and ring 44 and angularly to align projection 50 with detent slot 51. The projection 50 on spring ring 44 then drops into the depression or radial slot 51 in the flange 37, as shown in FIG. 5, thereby yieldably holding the nut 32 in proper angular position on the shell for the immediate recoupling of the connector parts, or the coupling of the part 11, in the condition shown in FIG. 3, to another similar connector part 10, by an operation including only the axial aligning of keys 30, 31 and keyways 21, 22 and the axial advance of the connector parts toward each other initially to mate their polarizing key and keyway formations, followed by the turning of the nut 32 relative to the mated shells 12 and 25. With nut 32 thus yieldably positioned on sheet 25 by detent 50, 51, the entry ends 41 of grooves 40 are in proper position for receiving coupling pins 24 whenever the shells 12 and 25 are properly oriented for coupling with each other. Thus, the operator need only concern himself with properly aligning the connector shells without reference to the position of the nut.

Although only one embodiment of the invention has been illustrated in the accompanying drawings and described in the foregoing specification, it is to be expressly understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. A separable connector comprising two main connector parts adapted to be matingly connected when aligned by movement toward each other, polarizing interfitting formations on such parts which permit their mating in only a selected angular position about their axes relative to each other, a nut on one connector part rotatable with respect thereto but held from axial escape therefrom, the nut and the other connector part having cooperable means thereon for drawing the engaged connector parts together upon rotation of the nut in one direction with respect to the engaged connector parts, the nut being disengageable from the said other connector part upon rotation of the nut in the reverse direction so that the connector parts may then be separated by straight line movement, the nut in its terminal position at the end of its part-separating rotation occupying an angular position relative to the connector parts which permits its immediate rotation in the connector part coupling direction when the connector parts are in polarized alignment, and means yieldably retaining the nut in said terminal angular position with respect to said one connector part, said last-named means comprising a member in the form of a partial ring secured to and angularly fixed with respect to said one connector part, the latter having an annular groove adjacent its rear end within which the radially inner edge portion of said ring has a close fit, and said nut having an internal flange engageable with the forward face of and rotatable relative to the radially outer edge portion of said ring, and resilient compressible means interposed between said nut and said one connector part to resiliently urge said flange against said ring, said flange and ring having a cooperating projection and detent groove urged into mating relation by said resilient compressible means when said nut is in said terminal angular position.

2. A separable connector as claimed in claim 1, wherein said one connector part and nut have interfitting angular formations thereon which engage opposite ends of said resilient compressible means and prevent escape of the nut axially forwardly of said one connector part, and wherein said ring forcibly engages the rear surface of the flange on the nut, whereby the resilient compressible means is maintained under compression at all times.

3. A separable connector as claimed in claim 1, wherein said one connector part has a longitudinally extending groove in its outer surface, and the ring has a complementarily shaped lug received in said longitudinally extending groove for retaining the ring from rotation with respect to said one connector part.

4. A connector comprising an annular shell having an external shoulder, an annular coupling member surrounding said shell and having an internal flange, resilient means interposed under compression between said shoulder and flange, and an element fixedly mounted on and projecting radially from said shell for limiting relative axial movement of said coupling member and shell by said resilient means, said element including means cooperable with said flange for limiting relative angular movement of said shell and member, and said element and flange having cooperating interengageable parts urged into mating relation by said resilient means to yieldably retain said member in a predetermined angular position on the shell.

5. A connector as defined in claim 4, wherein said element and flange radially overlap and an axially extending portion of said element is engageable wtih radially-extending, angularly-spaced shoulders on said flange.

6. A connector as defined in claim 4, wherein said element includes an axially extending portion engageable with an axially extending groove in said shell for holding said element and shell against relative angular movement.

7. A connector as defined in claim 4, wherein said element is a split ring mounted in an external groove in said shell.

8. A connector as defined in claim 7, comprising an axially extending skirt on said member surrounding said element to prevent removal thereof from said groove when said resilient means is expanded.

9. A connector as defined in claim 4, comprising an axially extending portion on said element engageable with an axial groove on said shell to prevent relative angular movement of the element and shell and engageable with circumferentially spaced radial shoulders on said flange for limiting relative angular movement of said shell and member.

10. A coupling device comprising a cylindrical shell having an external rearwardly-facing shoulder, a coupling member surrounding said shell and having an internal forwardly-facing shoulder facing said external shoulder, resilient means interposed under compression between said shoulders for imparting rearward axial movement to said member relative to said shell, and means for limiting such relative axial movement of said shell and member by said resilient means, said coupling member and said second-named means having cooperable interengageable means thereon urged into interengagement by said resilient means for yieldably locking said member against angular movement from a predetermined angular position on the shell.

11. A separable connector comprising two main connector parts adapted to be matingly connected when aligned by movement toward each other, polarizing inter-fitting formations on such parts which permit their mating in only a selected angular position about their axes relative to each other, a nut on one connector part rotatable with respect thereto but held from axial escape therefrom, the nut and other connector part having cooperable means thereon for drawing the engaged connector parts together upon rotation of the nut in one direction with respect to the engaged connector parts, the nut being disengageable from said other connector part upon rotation of the nut in the reverse direction so that the connector parts may be separated by straight line movement, the nut in its terminal position at the end of its part-separating rotation occupying an angular position relative to the connector parts which permits its immediate rotation in the connector part-coupling direction when the connector parts are in polarized alignment, and means yieldably retaining the nut in said terminal angular position with respect to said one connector part, said last-named means comprising a member in the form of a partial ring secured to and angularly fixed with respect to said one connector part, the latter having an annular groove adjacent its rear end within which the radially inner edge portion of said ring has a close fit, said nut having an internal flange engageable with the forward face of and rotatable relative to the radially outer edge portion of said ring, and said ring having an axially extending projection engageable with radially-extending angularly-spaced surfaces of said flange for limiting angular movement of said nut relative to said one connector part.

References Cited by the Examiner
UNITED STATES PATENTS

| | | | |
|---|---|---|---|
| 2,400,351 | 5/46 | Hart | 339—90 X |
| 2,701,348 | 2/55 | Horn | 339—90 |
| 2,984,811 | 5/61 | Hennessey | 339—45 |
| 3,008,116 | 11/61 | Blanchenot | 339—186 X |

FOREIGN PATENTS

| | | |
|---|---|---|
| 857,344 | 12/60 | Great Britain. |
| 868,047 | 5/61 | Great Britain. |

JOSEPH D. SEERS, *Primary Examiner.*